Figure 1:
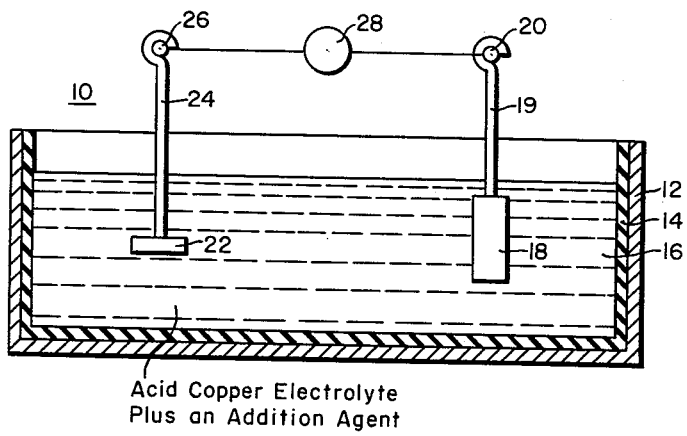

Aug. 22, 1961  R. E. HARROVER, JR., ET AL  2,997,428
ADDITION AGENT FOR ACID COPPER ELECTROLYTES
Filed Oct. 30, 1958

Acid Copper Electrolyte
Plus an Addition Agent

WITNESSES

INVENTORS
Robert E. Harrover, Jr.
& Richard P. Cope, Jr.
BY
ATTORNEY

United States Patent Office 2,997,428
Patented Aug. 22, 1961

2,997,428
ADDITION AGENT FOR ACID COPPER
ELECTROLYTES
Robert E. Harrover, Jr., Park Meadows, and Richard P. Cope, Jr., Pittsburgh, Pa., assignors to Westinghouse Electric Corporation, East Pittsburgh, Pa., a corporation of Pennsylvania
Filed Oct. 30, 1958, Ser. 770,775
11 Claims. (Cl. 204—52)

The present invention relates to depositing copper from acid electrolytes, and has particular reference to novel products adapted for addition to acid electrolyte plating baths whereby brighter and smoother copper electrodeposits are obtained.

Heretofore, numerous addition compounds have been suggested for incorporation in acid copper electrolytes for the purpose of providing improved deposition of copper on articles therefrom. The addition compounds suggested heretofore have not been completely satisfactory. For example, only a meager improvement in brightness and smoothness has been obtainable with certain of the addition agents suggested in the prior art. Moreover, the bright range obtainable with some of these agents is relatively narrow and in some cases the throwing power of the bath has actually been reduced.

Another disadvantage attendant with the use of many of the addition agents now commercially available is that the copper deposited from electrolyte baths containing such agents frequently tends to be quite brittle. This brittleness is undesirable in that it makes machining or other processing of members plated with such copper quite difficult. Striations and ribs also commonly result when plating from acid copper electrolytes containing many of the previously known addition agents.

The object of the present invention is to provide compounds comprising the reaction product of ammonia or certain derivatives thereof or certain monocyclic unsubstituted aromatic compounds and a compound having the nucleus $$-\underset{\underset{O}{\|}}{C}-\underset{\underset{H}{|}}{N}-\underset{\underset{S}{\|}}{C}-$$

which compounds are suitable for addition to acid electrolyte plating baths to promote brighter and smoother electrodeposition.

Another object of this invention is to provide a process for preparing a reaction product of ammonia or certain derivatives thereof or certain monocyclic unsubstituted aromatic compounds and a compound having the nucleus $$-\underset{\underset{O}{\|}}{C}-\underset{\underset{H}{|}}{N}-\underset{\underset{S}{\|}}{C}-$$

which compounds are suitable for addition to acid electrolyte plating baths to promote brighter and smoother electrodeposition.

Still another object of the present invention is to provide an acid electrolyte plating bath comprising copper sulfate, sulfuric acid and a novel addition agent comprising the reaction product of ammonia or certain derivatives thereof or certain monocyclic unsubstituted aromatic compounds and a compound having the nucleus $$-\underset{\underset{O}{\|}}{C}-\underset{\underset{H}{|}}{N}-\underset{\underset{S}{\|}}{C}-$$

said addition agent being present in an amount sufficient to promote brighter and smoother copper electrodeposition.

Figure 2:
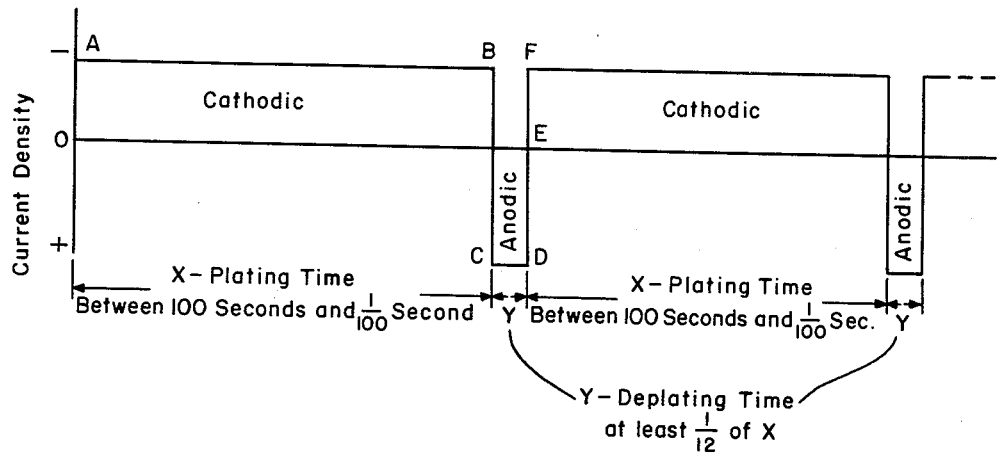

Other and further objects of the present invention will, in part, be obvious and will, in part, appear hereinafter. For a more complete understanding of the present invention, reference is made to the following description taken in conjunction with the accompanying drawing, in which:

FIGURE 1 is a sectional view in elevation of apparatus suitable for direct current electroplating; and FIG. 2 is a graph illustrating one type of periodic reverse current electroplating.

In the attainment of the foregoing objects and in accordance with the present invention, there are provided novel reaction products suitable for addition to acid electrolyte plating baths in specified amounts to promote brighter and smoother copper electrodeposition.

The novel reaction products are obtained by reacting substantially equimolar quantities of at least one compound having the nucleus $$-\underset{\underset{O}{\|}}{C}-\underset{\underset{H}{|}}{N}-\underset{\underset{S}{\|}}{C}-$$

with ammonia or certain derivatives thereof or certain monocyclic unsubstituted aromatic compounds.

The inclusion of these reaction products in the electrolyte provides a bath with relatively high throwing power. Furthermore, the bright range at both the high and low current density ends is extended beyond the limits normally attained with presently available addition agents. The relatively high throwing power and the extension of the bright range make it possible to plate all the surfaces of members having recesses, which are low current density areas, with uniformly bright and smooth deposits. The high current density extensions of the bright range also permits higher than normal current densities to be used, thus affording a savings in deposition time for any given thickness of plate.

Another advantage resulting from the incorporation of these addition agents in an acid copper electrolyte is the improvement in the "buffability" of the copper deposited. Usually the copper deposited from plating baths containing the addition agents of this invention is so bright that it requires no buffing at all. However, should a full bright plate not be obtained for one reason or another, the copper deposit is of such high quality and fine grain that only a very light buffing operation is necessary to prepare it for subsequent bright deposits of nickel, chromium or the like.

In preparing the novel reaction products of this invention, any of the several compounds having the nucleus $$-\underset{\underset{O}{\|}}{C}-\underset{\underset{H}{|}}{N}-\underset{\underset{S}{\|}}{C}-$$

may be reacted with ammonia or certain derivatives thereof as will be described more fully hereinbelow. An example of a particularly suitable aliphatic compound having the nucleus $$-\underset{\underset{O}{\|}}{C}-\underset{\underset{H}{|}}{N}-\underset{\underset{S}{\|}}{C}-$$

is acetylthiourea.

Examples of other compounds having the nucleus $$-\underset{\underset{O}{\|}}{C}-\underset{\underset{H}{|}}{N}-\underset{\underset{S}{\|}}{C}-$$

are 2-thiohydantoin and substitution derivatives of 2-thiohydantoin having at least one organic substituent in the 1, 5 positions. The nucleus of these 2-thiohydantoin substitution derivatives has the following structure:

$$\begin{array}{c}
-\overset{|}{\underset{|}{C}}\underset{(5)\quad(1)}{\text{————}}N-\\
\quad\\
O=\underset{(4)}{C}\underset{(3)}{\diagdown}\underset{(2)}{\diagup}\overset{|}{C}=S\\
\underset{|}{N}\\
H
\end{array}$$

Various organic radicals may be substituted at one or both of the 1 or 5 positions, providing the resultant compound obtained upon reaction with ammonia or derivatives thereof is soluble in the acid copper electrolyte in an amount sufficient to produce an appreciable improvement in brightness and smoothness of the copper deposited. Examples of suitable compounds are:

2-thiohydantoin
1-acetyl-2-thiohydantoin
5(2-hydroxylbenzal)-2-thiohydantoin
5-furfural-2-thiohydantoin
5-benzal-2-thiohydantoin
1-methyl-2-thiohydantoin Other examples for compounds having the nucleus

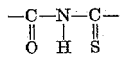

which are suitable for reaction with ammonia or derivatives thereof to produce novel compounds of this invention include 2-thiobarbituric acid and substitution derivatives of 2-thiobarbituric acid. The nucleus of these 2-thiobarbituric acid derivatives has the following structure:

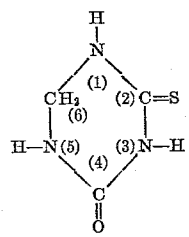

Various organic radicals may be substituted for hydrogen at any one or more of the 1, 5, or 6 positions, providing the resultant compound obtained upon reaction with the ammonia or derivatives thereof is soluble in the acid electroplating bath. Examples of suitable compounds of this nature include:

2-thiobarbituric acid
1-acetyl-2-thiobarbituric acid
1-benzoyl-2-thiobarbituric acid
1,5-diacetyl-2-thiobarbituric acid
2-thiopyrolidone-4
4-thiohydantoin
5-thio-1,2,4-triazolidinone-3
4-thiooxazolidinone-4
4-thiothiazolidinone-4
3-thio-1,2,4-oxadiazolidinone-5
3-thio-1,2,4-thiadiazolidinone-5
2-thioazolidinone-6
2-thio-1,3-diazolidinone-4
2-thio-1,4-diazolidinone-6
3-thio-1,2,4-triazolidinone-5
2-thio-1,3,5-triazolidinone-4
5-thio-1,2,4-triazolidinone-3
1-thio-2-benzazolone-3
3-thio-2-benzazolone-1

Compounds which may be reacted with compounds having the nucleus

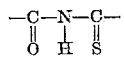

to form the addition agents of this invention comprise compounds selected from the group consisting of (A) monocyclic unsubstituted aromatic compounds containing in the ring structure from 4 to 6 carbon atoms and from 1 to 2 nitrogen atoms per molecule and (B) compounds having the formula

wherein R is a radical selected from the group consisting of hydrogen; monovalent and divalent saturated aliphatic hydrocarbon radicals having from 1 to 4 carbon atoms and in which the substituents are —NH$_2$ radicals; monovalent and divalent alicyclic radicals containing from 5 to 6 carbon atoms in the ring in which the substituents are selected from the group consisting of —CH$_3$ and —NH$_2$ radicals; monovalent and divalent heterocyclic radicals having from 5 to 6 carbon atoms in the ring and in which hetero atoms occur only in the ring structure and the substituents occur only on the carbon atoms and are —NH$_2$ radicals; phenyl radicals; and aminophenyl radicals.

Specific examples of compounds included within the scope of the terms identified as (A) and (B) above include: ammonia, isopropylamine, ethylenediamine, dibutylamine, methylpropylenediamine, diethylenediamine, cyclopentylamine, dicyclohexylamine, cyclopentylmethylamine, cyclopentylethylenediamine, 3-methylcyclohexylamine, 1,2-diaminocyclopentane, 2-aminothiazol, 3,5-diamino-1,2,4-triazole, aniline, p-aminoaniline, methylaniline, methyl - 2 - aminothiazole, 3-methylamino-5-amino-1,2,4-triazole, 2-cyclohexylaminothiazole, ethyl-4-methylcyclohexylamine, 4-cyclohexylamino-5-amino-2-pyridine, 4-methylaminocyclohexylamine, p-aminomethylaniline, 3, 3'-diisothiazolylamine, cyclohexylaniline, 2-methylcyclohexylthiazol-2, diphenylamine, 3-amino-5-phenylamino-1,2,4-triazole thiazolyl-2-phenylamine, pyridine, pyrimidine, pyrazine, phenyl-4-aminocyclohexylamine, 4-methylcyclohexylpropylenediamine, N-(2-thiazolyl)-p-aminoaniline, dimethylcyclohexylamine, phenylethylenediamine, di-4-aminocyclohexylamine, N-cyclopentylaminoaniline, 3-(2'-thiazolylamino)-5-amino-1,2,4 - triazole, phenyl - p-aminoaniline, 2-thiazolylethylenediamine, 3-p-aminophenyl-5-amino-1,2,4-triazole, N-(2'-aminoethylene) - 1,4-diaminocyclohexane, N-cyclopentyl-1,4 - diaminocyclohexane, cyclohexylmethylcyclohexylamine, N-(2'-thiazolyl)-1,2-diaminocyclopentane, di - p - aminophenylamine, p-aminophenyl-4-methylcyclohexylamine, 4-methylcyclohexylphenylamine, p - aminophenylethylenediamine, p-aminophenyl-3-aminocyclopentylamine, N - (2' - aminoethylene)-3,5-diaminopyridine, N-(3-amino-1,4-thiapyranyl-5)-4'-methylcyclohexylamine, N-(3' - methylcyclopentyl)-1,4-diaminocyclohexane, N-(3'-methylcyclohexyl)-4-aminocyclohexane, 3'-aminocyclohexyl - 3 - aminopyridyl-5-amine and di-2-amino-1,4-pyranyl-4-amine.

The following specific examples are set forth to illustrate the preparation of the novel addition components suitable for addition to acid plating baths in accordance with the present invention.

*Example A*

About 1 mol of 1-acetyl-2-thiohydantoin and one mol of ammonia (28% aqueous solution) are dissolved in three liters of ethanol and placed within a suitable reaction vessel. The resultant solution then is heated to boiling and refluxed for about 30 minutes. The solution then is evaporated to about one liter in volume. The resultant product is a viscous slurry. It is cooled, filtered, and the separated crystals are air dried. The reaction product is a light brown, crystalline solid which darkens to a reddish brown on exposure to air. This reaction product, when added to acid copper plating baths, brings about an improved brightness in copper electro-deposited therefrom.

*Example B*

One mol of acetylthiourea is dissolved in 1.1 mols of n-propyl amine by heating the components in a suitable reaction vessel. Upon cooling, a solid reaction product crystallizes from the solution. The product obtained upon air drying is a white crystalline mass suitable for addition to an acid electrolyte for the purpose of bringing about improved brightness of metal electrodeposited therefrom. The product has a melting point of 170°–

173° C. The melting point of this product when admixed with acetylthiourea, is 126° C.

Example C

One mol of 1-acetyl-2-thiohydantoin and 1.1 mols of diethylamine are dissolved in 2 liters of ethanol, and the mixture is heated to reduce it in volume to about 500 ml. Upon cooling, a reddish-brown, tar-like product crystallizes out of the solution. The crystals are washed with alcohol to remove viscous material leaving a yellow crystalline product suitable for addition to an acid plating bath. This product melts at 229°–235° C.

Example D 0.2 mol of 2-thiohydantoin was slurried in 500 ml., of ethanol and 0.22 mol of n-propylamine were added thereto in a suitable reaction vessel. The mixture was refluxed for one hour at which time all of the solids were in solution. The reaction mixture was cooled in an ice bath and filtered. 8.9 gms. of a white, plate-like crystalline product was recovered. The filtrate was evaporated to 100 ml. and allowed to cool at which time brown plates of the reaction product crystallized. Upon filtration, 18.9 gms. were recovered. The second crystalline material was dissolved in boiling ethanol, 5 grams of carbon were added thereto, and the mixture maintained at a temperature just under its boiling point for about 5 minutes. The hot mixture was filtered and cooled in an ice bath whereupon a light pink colored product crystallized from the solution. The crystals were filtered and air dried. When heated, a portion of the light pink crystals melted at 119°–120° C., and the remainder did not melt until a temperature of 139°–140° C. was reached. It is believed that the crystalline product is a mixture of two reaction products comprising the mono- and dihydantoinated amines.

Example E

One mol of 2-thiobarbituric acid, three mols of dimethylamine and three mols of diethylamine are heated in a suitable flask to the boiling point and refluxed for one hour. The resultant mixture is cooled in an ice bath, filtered and air dried. The crystalline product obtained is suitable for addition to an acid plating bath.

Example F

Equimolar quantities of 2-thiohydantoin and 2-aminothiazol were slurried in ethanol and heated to boiling. The reaction mixture was refluxed for one-half hour, cooled and filtered. The red crystalline, needle, reaction product melted at 235°–237° C. This reaction product when added to acid plating baths, brings about an improved brightness in copper electrodeposited therefrom.

Example G

Two mols of 2-thiohydantoin and one mol of methanediamine were heated to boiling in ethanol. The reaction mixture was boiled down to 40% of its original volume, cooled and filtered. A brown-colored crystalline reaction product was recovered which melted at 227°–229° C.

Example H

An equimolar mixture of pyridine and 2-thiohydantoin was refluxed in ethanol for one-half hour. The reaction mixture was boiled until its volume had been reduced 50%. It then was cooled, filtered and air dried. A yellow-brown crystalline reaction product was recovered which melted at 231°–232° C.

The addition agents of this invention may be employed alone in acid copper plating baths or in combination with certain prior known addition agents. For example, the reaction product of 1-acetyl-2-thiohydantoin and diethylamine has been added to a series of acid copper baths containing (1) phenol sulfonic acid, (2) thiourea, (3) glue and (4) metallic addition agents such as cadmium and the like. In every case, better copper electrodeposits were obtained using the baths containing either the addition agents of this invention alone or in combination with these known addition agents than were obtained using the plating baths which contained only the prior addition agents.

The addition of the novel reaction products prepared as described hereinabove to acid electrolyte plating baths enables the electrodeposition of copper having a highly refined grain size and having smooth, bright surfaces. Many of the disadvantages encountered with addition agents previously known are eliminated by the utilization of the reaction products of this invention in such acid electrolytes.

Improved brightness and smoother copper electrodeposition is obtained when as little as 0.0001 ounce of the addition agent of this invention per gallon of electrolyte is employed in an acid electrolyte plating bath. The addition agent may be employed in amounts up to as high as about 0.05 ounce per gallon. Larger quantities of the addition agents, for example, up to as high as 0.5 ounce per gallon have been used satisfactorily. The optimum proportions are from 0.001 to 0.01 ounce of the reaction product per gallon of electrolyte.

It has been determined that in certain plating baths improved results are obtained by incorporating a minor amount of chlorides, present as the chloride ion, in the plating bath with the addition agents described hereinabove. Commercial hydrochloric acid (37%) may be used for this purpose to provide from about 0.001 ounce per gallon to 0.06 ounce per gallon of chloride ion component depending upon the quantity of addition agent introduced into the plating bath. Alkali metal chlorides such as sodium chloride and other ionizable chloride salts may be added to introduce the chloride ion into the electrolyte.

Acid copper electrolytes suitable for plating copper are well known. Ordinarily, such electrolytes comprise an aqueous solution having dissolved therein from 20 to 40 ounces per gallon of copper sulfate and from 1.3 to 13 ounces per gallon of sulfuric acid. In industry at the present time, one widely used acid copper bath comprises a solution of 28 ounces per gallon of copper sulfate crystals and 8 ounces per gallon of sulfuric acid (98%). Into the acid copper electrolyte there may be added the addition agents of this invention in an amount of from 0.0001 to 0.05 ounce per gallon of electrolyte. The best results have been obtained with from 0.001 to 0.01 ounce of the reaction product per gallon. It will be appreciated that as the electrolyte is used in plating the addition agent will require replenishing from time to time. When treated with these addition agents, very satisfactory copper plating will result when the bath is at any temperature from 40° F. up to about 150° F. Excellent copper deposits have been secured using baths operating at temperatures of from about 70° F. to about 125° F., which temperatures appear to define the optimum range.

As a result of numerous tests run under comparable conditions, both in the laboratory and in the shop, it has been determined that these addition agents enable the brightest copper to be deposited that has been secured with any single known addition agent, and furthermore the electrodeposited copper is relatively non-brittle.

Acid copper aqueous electroplating electrolytes with the addition agents of this invention added thereto, with or without organic acids, water soluble polysaccharides or any other additive capable of extending the useful life of the addition agents in the bath or otherwise improving the deposition, as will be set forth hereinafter, may be employed for plating metal by passing either continuous direct current or periodically reversed electrical current or other suitable electrical current therethrough. Excellent results have been obtained with direct current plating from such electrolytes. However, periodic reverse current has given outstanding electrodeposits characterized by an absence of nodules and having edges and surfaces which are substantially smoother than attainable with direct current.

Referring to the drawing there is illustrated in FIG. 1 an apparatus 10 for practicing the present invention. This apparatus comprises a tank 12 provided with a suitable liner 14 of rubber, glass or the like, resistant to the acid electrolyte, carrying an electrolyte 16 composed of an aqueous solution of copper sulfate, sulfuric acid and an addition agent as described herein. Disposed within the electrolyte is an anode 18 that may be composed of copper or lead, or separate anodes of both. If lead anodes are used, the copper must be replenished by introducing copper sulfate into the electrolyte 16 from time to time. The anode 18 is suspended by a support 19 from a conductor bar 20. A member 22 to be plated with copper is suspended by a support 24 from a second conductor bar 26. The conductor bars 20 and 26 are provided with electrical current from a suitable source 28 which may be a generator, a rectifier, storage batteries or the like. Electrical current passing from the source 28 to the conductor bars 20 and 26 passes through the anode 18, electrolyte 16 and the member 22 to cause copper to be deposited from the electrolyte upon the base. The addition agents will cause the copper to be deposited as a smooth bright layer substantially free from brittleness and striations or ribbing. The copper deposited will exhibit a highly refined grain and will be superior to copper deposited from an acid copper electrolyte bath containing many of the other known addition agents.

Copper may be plated from the above described electrolyte containing the addition agent of this invention by means of a periodically reversed electrical current composed of cycles, each of which passes electrical current through the member for a period of time of from 0.01 second to 100 seconds to plate copper on the base and then the direction of flow of the current is reversed to deplate a part of the previously plated copper. The time and the magnitude of the deplating current is such that it applies from about 8% to 90% of the coulombs applied during the previous plating period. Assuming 100% efficiency during the deplating period, this means that from 8% to 90% of the copper deposited during the previous plating period in each cycle is deplated. The increment of copper remaining on the base after the cycle consists of smooth, sound copper upon which a second layer of copper is plated by the plating portion of the next cycle of periodic reversed current and then a portion of this second increment is deplated by passing of deplating current leaving a second increment of still smoother copper than the first increment, and so on.

Referring to FIG. 2 of the drawing, a graph is shown illustrating one type of periodic reverse current as it is applied to the base. Such periodic cycles may be produced by periodically reversing the flow of uniform direct current. It is assumed that the base when first immersed in the electrolyte is at a zero potential so that no current flows. When the first cycle of periodically reversed current is applied, a cathodic or plating current of a density of the value A is applied and metal is plated for a period of time X to a point B, then the direction of flow of the current is reversed so that the current density in the member drops from the value B to zero and then becomes anodic and will deplate copper, reaching a deplating current density of C. Metal is deplated for a period of time Y, which is about at least 1/12 of the length of period X, at the current density of C to D until sufficient coulombs of deplating current have been applied to equal from 8% to 90% of the coulombs applied during the plating period X. The cycle A—B—C—D deposits an increment of sound, smooth copper on the base. The direction of current flow is again reversed from D through zero and then plating current of a density value of F is applied to begin another cycle which will plate a second increment of copper.

It will be understood that the showing in FIG. 2 is merely schematic and that the current density is not necessarily uniform from A to B or C to D, as shown, but will usually vary and be relatively non-uniform. Also in reversing from B to C and from D to F the time required is finite and these lines will not be vertical, as shown, but will take an appreciable period of time, depending upon the various factors involved in the plating installation. The deplating or anodic current density C—D may be equal to the plating current density A—B, or exceed it or may be as low as 8% of the plating current density. Reference should be had to Patents 2,451,341, 2,678,909 and 2,470,775 for additional information as to periodic reverse current cycles.

In order to indicate even more fully the advantages and capabilities of the present invention, the following specific examples are set forth to illustrate the utilization of the addition agents of this invention in acid electrolyte plating baths.

*Example I*

An aqueous electroplating electrolyte of the following composition was prepared:

| | Oz. per gal. |
|---|---|
| Copper sulfate (crystals) [CuSO$_4$.5H$_2$O] | 28 |
| Sulfuric acid (98%) | 8 |
| Reaction product of 2-thiohydantoin and pyridine | 0.001 |

This bath was operated at various temperatures from 40° F. to 150° F. with excellent results. Bath temperatures of from 70° F. to 125° F. appeared to give optimum plating results.

Copper was plated from the bath of this Example I on rectangular brass panels using direct current at current densities of from 5 to 200 amperes per square foot. In each case the copper had a highly refined grain and was quite bright.

Copper was plated on other panels from the bath of Example I using a periodic reverse current having the following cycles:

| | Plating time, seconds | Deplating time, seconds |
|---|---|---|
| (a) | 2 | 1/2 |
| (b) | 5 | 1 |
| (c) | 10 | 2 |
| (d) | 15 | 3 |
| (e) | 5 | 5 |
| (f) | 40 | 20 |
| (g) | 60 | 30 |

The current density during each portion of the cycles (a) and (b) was 50 amperes per square foot and 60 amperes per square foot for cycles (c) and (d). The current density during the plating portion of cycles (e), (f) and (g) was 75 amperes per square foot. During the deplating period of (e) the current density was 7.5 amperes per square foot (10% reverse coulombs). During the deplating periods of (f) and (g) the current density was 75 amperes per square foot. The periodic reverse current cycles in each case produced excellent smooth deposits of copper better than anything secured under the same conditions using many other addition agents previously known in the art.

In another test, 0.01 ounce per gallon of the reaction product of 1-acetyl-2-thiohydantoin and aniline was used instead of the reaction product employed in Example I. The plating solution produced direct current plated copper deposits on base members fully equivalent to those described in Example I.

In a still further test, 0.0003 ounce per gallon of the reaction product of acetylthiourea and diethylamine was used instead of the reaction product of Example I. The plating solution produced copper deposits on base members which were semi-bright and of such quality that they required only a very light color buff to prepare them for subsequent bright nickel or chromium deposition.

Example II

The following electrolyte was prepared:

| | Oz. per gal. |
|---|---|
| Copper sulfate (crystals) [$CuSO_4.5H_2O$] | 28 |
| Sulfuric acid (98%) | 8 |
| Reaction product of 2-thiohydantoin and menthanediamine | .002 |

When direct current was applied to the electrolyte, excellent deposits were produced on base members at current densities of from 5 to 200 amperes per square foot. A periodic reverse current having a plating portion of 20 seconds and deplating portion of 4 seconds was employed in plating copper on members from the electrolyte at various current densities of up to 200 amperes per square foot for both portions of the cycle with excellent copper deposits being secured.

Other baths were prepared as in this Example II using progressively larger amounts of the reaction product up to 0.005 ounce per gallon with progressively increasing quality of the deposits. The copper electrodeposited on base members from each electrolyte was characterized by copper of a highly refined grain.

It has been determined that the addition of certain water soluble carboxylic acids or saccharide or water soluble polysaccharide such as dextrin, or dextrose to acid copper electrolyte baths containing the reaction products of this invention enables these reaction products to function at their maximum efficiency for longer periods of time than is possible with the reaction products alone. Citric acid, aconitic acid, and oxalic acid are examples of acids which have proven beneficial for this purpose. Any of these or mixtures of two or more may be employed in amounts of from 0.001 ounce up to about 3 ounces per gallon of electrolyte or up to their limit of solubility in the electrolyte. Saccharides or water soluble polysaccharides such as dextrin or dextrose may be employed in amounts of from about 0.001 to about 0.25 ounce per gallon of electrolyte, though amounts as low as 0.0005 ounce and as high as 5.0 ounces per gallon of electrolyte may be used. The saccharides, water soluble polysaccharides and carboxylic acid may be employed singly or in combination of any two or more.

The following examples illustrate the incorporation of some of these latter materials into an acid copper electrolyte bath containing the reaction products of this invention.

Example III

| | Oz. per gal. |
|---|---|
| Copper sulfate (crystals) [$CuSO_4.5H_2O$] | 28 |
| Sulfuric acid (98%) | 8 |
| Reaction product of acetyl thiourea and propylamine | 0.0005 |
| Dextrin (yellow) | 0.008 |

The copper deposits plated from this electrolyte had better color than deposits obtained from the electrolyte without the dextrin.

This electrolyte produced bright copper deposits for about twice as many days than was possible using the electrolyte of Example I.

Example IV

| | Oz. per gal. |
|---|---|
| Copper sulfate (crystals) [$CuSO_4.5H_2O$] | 28 |
| Sulfuric acid (98%) | 8 |
| Reaction product of 2-thiobarbituric acid with dimethylamine and diethylamine in equimolar parts | 0.002 |
| Hydrochloric acid (37%) | 0.006 |

The copper deposits obtained using this electrolyte had a slightly better color than those obtained with the electrolyte of Example III, though they were not noticeably brighter in appearance.

Example V

| | Oz. per gal. |
|---|---|
| Copper sulfate (crystals) [$CuSO_4.5H_2O$] | 28 |
| Sulfuric acid (98%) | 8 |
| Reaction product of 2-thiohydantoin and 2-amino-thiazol | 0.003 |
| Citric acid | 0.25 |

This electrolyte produced bright copper deposits for a longer period of time than was possible using the electrolyte of Example IV.

Another satisfactory plating bath is prepared adding 0.008 ounce per gallon of dextrose to the electrolyte of Example V.

Example VI

The following electrolyte is prepared:

| | Oz. per gal. |
|---|---|
| Copper sulfate (crystals) [$CuSO_4.5H_2O$] | 28 |
| Sulfuric acid (98%) | 8 |
| Reaction product of 5-furfural-2-thiohydantoin and ammonia | 0.0015 |
| Hydrochloric acid (37%) | 0.002 |
| Dextrin | 0.004 |

The copper deposits obtained using this electrolyte has a better color and the electrolyte produces such deposits for a longer period of time than the electrolyte of Example I.

While the present invention has been described with particular reference to preferred embodiments thereof, it will be understood, of course, that certain changes, substitutions, modifications and the like may be made therein without departing from its true scope.

We claim as our invention:

1. An aqueous electrolyte plating solution comprising from 20 to 40 ounces per gallon of copper sulfate, from 1.3 to 13 ounces per gallon of sulfuric acid and from 0.0001 to 0.5 ounce per gallon of the product obtained by admixing and heating substantially equimolar quantities of at least one compound having the nucleus.

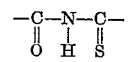

with at least one compound selected from the group consisting of (A) monocyclic unsubstituted aromatic compounds containing in the ring structure from 4 to 6 carbon atoms and from 1 to 2 nitrogen atoms per molecule and (B) compounds having the formula

wherein R is a radical selected from the group consisting of hydrogen; monovalent and divalent saturated aliphatic hydrocarbon radicals having from 1 to 4 carbon atoms and in which the substituents are —$NH_2$ radicals; monovalent and divalent alicyclic radicals containing from 5 to 6 carbon atoms in the ring in which the substituents are selected from the group consisting of —$CH_3$ and —$NH_2$ radicals; monovalent and divalent heterocyclic radicals having from 5 to 6 carbon atoms in the ring and in which hetero atoms occur only in the ring structure and the substituents occur only on the carbon atoms and are —$NH_2$ radicals; phenyl radicals; and aminophenyl radicals.

2. An aqueous electrolyte as set forth in claim 1 which contains from 0.001 to 0.06 ounce of chloride ion in each gallon of the electrolyte.

3. An aqueous electrolyte as set forth in claim 1 which contains from 0.001 to 3 ounces of at least one water soluble carboxylic acid in each gallon of the electrolyte.

4. An aqueous electrolyte as set forth in claim 1 which contains from 0.0005 to 5.0 ounces of dextrin in each gallon of the electrolyte.

5. An aqueous electrolyte as set forth in claim 1 which contains from 0.0005 to 5.0 ounces of dextrose in each gallon of the electrolyte.

6. In the process of plating copper on a base member from an acid electrolyte having an anode therein, said electrolyte comprising copper sulfate and sulfuric acid, the improvement which comprises adding to the electrolyte from 0.0001 to 0.5 ounce per gallon of the product obtained by admixing and heating substantially equimolar quantities of at least one compound having the nucleus

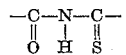

with at least one compound selected from the group consisting of (A) monocyclic unsubstituted aromatic compounds containing in the ring structure from 4 to 6 carbon atoms and from 1 to 2 nitrogen atoms per molecule and (B) compounds having the formula

wherein R is a radical selected from the group consisting of hydrogen; monovalent and divalent saturated aliphatic hydrocarbon radicals having from 1 to 4 carbon atoms and in which the substituents are —NH₂ radicals; monovalent and divalent alicyclic radicals containing from 5 to 6 carbon atoms in the ring in which the substituents are selected from the group consisting of —CH₃ and —NH₂ radicals; monovalent and divalent heterocyclic radicals having from 5 to 6 carbon atoms in the ring and in which hetero atoms occur only in the ring structure and the substituents occur only on the carbon atoms and are —NH₂ radicals; phenyl radicals; and aminophenyl radicals; and then passing cycles of periodically reversed electrical current through the base member, the aqueous electrolyte, and the anode, the electrical current during each cycle first flowing in one direction to plate copper on the member for a period of time of from about 0.01 second to 100 seconds, then the direction of current flow reversing for a period of time to deplate a portion of the previously plated copper, the coulombs applied during the deplating period equal to from 8% to 90% of the coulombs applied during the plating period, the plurality of cycles of periodically reversed current electrodepositing bright, smooth copper on the base member.

7. In the process of plating copper on a base member from an acid electrolyte having an anode therein, said electrolyte comprising copper sulfate and sulfuric acid, the improvement which comprises adding to the electrolyte from 0.0001 to .05 ounce per gallon of the product obtained by admixing and heating substantially equimolar quantities of at least one compound having the nucleus

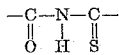

with at least one compound selected from the group consisting of (A) monocyclic unsubstituted aromatic compounds containing in the ring structure from 4 to 6 carbon atoms and from 1 to 2 nitrogen atoms per molecule and (B) compounds having the formula

wherein R is a radical selected from the group consisting of hydrogen; monovalent and divalent saturated aliphatic hydrocarbon radicals having from 1 to 4 carbon atoms and in which the substituents are —NH₂ radicals; monovalent and divalent alicyclic radicals containing from 5 to 6 carbon atoms in the ring in which the substituents are selected from the group consisting of —CH₃ and —NH₂ radicals; monovalent and divalent heterocyclic radicals having from 5 to 6 carbon atoms in the ring and in which hetero atoms occur only in the ring structure and the substituents occur only on the carbon atoms and are —NH₂ radicals; phenyl radicals; and aminophenyl radicals; and then passing a plating electrical current from the anode through the electrolyte and to the base member to deposit copper on the base member.

8. In the process of plating copper on a base member from an acid electrolyte having an anode therein, said electrolyte comprising copper sulfate and sulfuric acid, the improvement which comprises adding to the electrolyte from 0.001 to 0.06 ounce per gallon of chloride ion and from 0.0001 to .05 ounce per gallon of the product obtained by admixing and heating substantially equimolar quantities of at least one compound having the nucleus

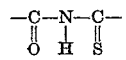

with at least one compound selected from the group consisting of (A) monocyclic unsubstituted aromatic compounds containing in the ring structure from 4 to 6 carbon atoms and from 1 to 2 nitrogen atoms per molecule and (B) compounds having the formula

wherein R is a radical selected from the group consisting of hydrogen; monovalent and divalent saturated aliphatic hydrocarbon radicals having from 1 to 4 carbon atoms and in which the substituents are —NH₂ radicals; monovalent and divalent alicyclic radicals containing from 5 to 6 carbon atoms in the ring in which the substituents are selected from the group consisting of —CH₃ and —NH₂ radicals; monovalent and divalent heterocyclic radicals having from 5 to 6 carbon atoms in the ring and in which hetero atoms occur only in the ring structure and the substituents occur only on the carbon atoms and are —NH₂ radicals; phenyl radicals; and aminophenyl radicals; and then passing a plating electrical current from the anode through the electrolyte and to the base member to deposit copper on the base member.

9. In the process of plating copper on a base member from an acid electrolyte having an anode therein, said electrolyte comprising copper sulfate and sulfuric acid, the improvement which comprises adding to the electrolyte from 0.001 to 3 ounces per gallon of at least one water soluble carboxylic acid and from 0.0001 to .05 ounce per gallon of the product obtained by admixing and heating substantially equimolar quantities of at least one compound having the nucleus

with at least one compound selected from the group consisting of (A) monocyclic unsubstituted aromatic compounds containing in the ring structure from 4 to 6 carbon atoms and from 1 to 2 nitrogen atoms per molecule and (B) compounds having the formula

wherein R is a radical selected from the group consisting of hydrogen; monovalent and divalent saturated aliphatic hydrocarbon radicals having from 1 to 4 carbon atoms and in which the substituents are —NH₂ radicals; monovalent and divalent alicyclic radicals containing from 5 to 6 carbon atoms in the ring in which the substituents are selected from the group consisting of —CH₃ and —NH₂ radicals; monovalent and divalent heterocyclic radicals having from 5 to 6 carbon atoms in the ring and in which hetero atoms occur only in the ring structure and the substituents occur only on the carbon atoms and are —$NH_2$ radicals; phenyl radicals; and aminophenyl radicals; and then passing a plating electrical current from the anode through the electrolyte and to the base member to deposit copper on the base member.

10. In the process of plating copper on a base member from an acid electrolyte having an anode therein, said electrolyte comprising copper sulfate and sulfuric acid, the improvement which comprises adding to the electrolyte from 0.0005 to 5.0 ounces per gallon of dextrin and from 0.0001 to .05 ounce per gallon of the product obtained by admixing and heating substantially equimolar quantities of at least one compound having the nucleus

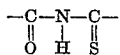

with at least one compound selected from the group consisting of (A) monocyclic unsubstituted aromatic compounds containing in the ring structure from 4 to 6 carbon atoms and from 1 to 2 nitrogen atoms per molecule and (B) compounds having the formula

wherein R is a radical selected from the group consisting of hydrogen; monovalent and divalent saturated aliphatic hydrocarbon radicals having from 1 to 4 carbon atoms and in which the substituents are —$NH_2$ radicals; monovalent and divalent alicyclic radicals containing from 5 to 6 carbon atoms in the ring in which the substituents are selected from the group consisting of —$CH_3$ and —$NH_2$ radicals; monovalent and divalent heterocyclic radicals having from 5 to 6 carbon atoms in the ring and in which hetero atoms occur only in the ring structure and the substituents occur only on the carbon atoms and are —$NH_2$ radicals; phenyl radicals; and aminophenyl radicals; and then passing a plating electrical current from the anode through the electrolyte and to the base member to deposit copper on the base member.

11. In the process of plating copper on a base member from an acid electrolyte having an anode therein, said electrolyte comprising copper sulfate and sulfuric acid, the improvement which comprises adding to the electrolyte from 0.0005 to 5.0 ounces per gallon of dextrose and from 0.0001 to .05 ounce per gallon of the product obtained by admixing and heating substantially equimolar quantities of at least one compound having the nucleus

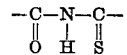

with at least one compound selected from the group consisting of (A) monocyclic unsubstituted aromatic compounds containing in the ring structure from 4 to 6 carbon atoms and from 1 to 2 nitrogen atoms per molecule and (B) compounds having the formula

wherein R is a radical selected from the group consisting of hydrogen; monovalent and divalent saturated aliphatic hydrocarbon radicals having from 1 to 4 carbon atoms and in which the substituents are —$NH_2$ radicals; monovalent and divalent alicyclic radicals containing from 5 to 6 carbon atoms in the ring in which the substituents are selected from the group consisting of —$CH_3$ and —$NH_2$ radicals; monovalent and divalent heterocyclic radicals having from 5 to 6 carbon atoms in the ring and in which hetero atoms occur only in the ring structure and the substituents occur only on the carbon atoms and are —$NH_2$ radicals; phenyl radicals; and aminophenyl radicals; and then passing a plating electrical current from the anode through the electrolyte and to the base member to deposit copper on the base member.

References Cited in the file of this patent
UNITED STATES PATENTS 2,853,443   Harrover _____ Sept. 23, 1958